United States Patent
McCune, Jr.

(10) Patent No.: US 9,673,697 B2
(45) Date of Patent: Jun. 6, 2017

(54) AC/DC POWER CONVERSION METHODS AND APPARATUS

(71) Applicant: Earl W McCune, Jr., Santa Clara, CA (US)

(72) Inventor: Earl W McCune, Jr., Santa Clara, CA (US)

(*) Notice: Subject to any disclaimer, the term of this patent is extended or adjusted under 35 U.S.C. 154(b) by 268 days.

(21) Appl. No.: 13/971,976

(22) Filed: Aug. 21, 2013

(65) Prior Publication Data

US 2013/0336031 A1 Dec. 19, 2013

Related U.S. Application Data

(63) Continuation-in-part of application No. 12/841,608, filed on Jul. 22, 2010.

(51) Int. Cl.
*H02M 5/458* (2006.01)
*H02M 1/42* (2007.01)
*H02M 7/217* (2006.01)

(52) U.S. Cl.
CPC ........... *H02M 1/42* (2013.01); *H02M 7/2176* (2013.01)

(58) Field of Classification Search
CPC ............ H02M 1/42; H02M 7/04; H02M 7/12; H02M 7/21; H02M 7/217; H02M 7/2173; H02M 7/2176; H02M 7/219; H02M 7/23; H02M 7/25; H02M 2007/2195
USPC ................. 363/37, 80–82, 84, 89, 125, 127
See application file for complete search history.

(56) References Cited

U.S. PATENT DOCUMENTS

| | | | | |
|---|---|---|---|---|
| 6,385,058 B1* | 5/2002 | O'Meara | ........... | H02M 3/33561 363/21.01 |
| 7,012,413 B1* | 3/2006 | Ye | ................................. | 323/284 |
| 7,633,782 B1* | 12/2009 | Herbert | ..................... | G05F 1/70 323/207 |
| 7,796,411 B2* | 9/2010 | Jin | ........................ | H02J 3/1842 363/87 |
| 8,044,631 B2* | 10/2011 | Dai | .................... | H02M 7/53873 318/727 |
| 8,477,519 B2* | 7/2013 | Nakamura | .......... | H02M 1/4258 363/126 |
| 8,520,413 B2* | 8/2013 | Tran | ...................... | H02M 3/155 323/222 |

(Continued)

OTHER PUBLICATIONS

Aug. 18, 2014 Office Action from U.S. Appl. No. 13/859,869.

*Primary Examiner* — Gary L Laxton
*Assistant Examiner* — Kevin H Sprenger
(74) *Attorney, Agent, or Firm* — Patent Law Professionals, P.C.; William E. Winters

(57) ABSTRACT

An AC/DC power conversion apparatus comprises an AC/DC converter for converting AC power to DC power for a load and a controller that maintains a power factor of the load as the load varies. The AC/DC converter includes an inductor and a plurality of switches that alternately connects and disconnects the inductor to and from an AC power source, to generate the DC power for the load. The plurality of switches is controlled by a plurality of switch drive signals generated by the controller, based on comparisons of an AC voltage from the AC power source to a DC output voltage produced by the AC/DC converter. To maintain the power factor of the load, the controller is configured to adjust the frequency of the plurality of switch drive signals in response to variations in the load while holding the duty cycles of the switch drive signals constant.

22 Claims, 11 Drawing Sheets

(56) References Cited

U.S. PATENT DOCUMENTS

| | | | |
|---|---|---|---|
| 8,705,252 B2* | 4/2014 | Duvnjak | H02M 1/4258 363/126 |
| 8,803,489 B2* | 8/2014 | Li | H02M 1/4216 323/207 |
| 8,937,821 B2* | 1/2015 | Amano | H02M 7/219 363/125 |
| 2002/0130640 A1* | 9/2002 | Acatrinei | G05F 1/70 323/222 |
| 2002/0181262 A1* | 12/2002 | Wade | 363/125 |
| 2006/0220628 A1* | 10/2006 | Soldano | H02M 1/4233 323/282 |
| 2010/0014329 A1* | 1/2010 | Zhang et al. | 363/89 |
| 2010/0045255 A1* | 2/2010 | Chojecki et al. | 323/284 |
| 2011/0134674 A1* | 6/2011 | Ivanov | H02M 7/219 363/127 |
| 2012/0155132 A1* | 6/2012 | Uno | H02M 1/4225 363/80 |
| 2014/0140113 A1* | 5/2014 | Oh | H02M 1/4241 363/89 |

\* cited by examiner

| Switch | Vin > Vout | Vin < -Vout | \|Vin\| < Vout |
|---|---|---|---|
| 602 | D | OFF | OFF |
| 604 | 1-D | ON | OFF |
| 606 | OFF | D | OFF |
| 608 | ON | 1-D | OFF |

AC/DC POWER CONVERSION METHODS AND APPARATUS

CROSS-REFERENCE TO RELATED APPLICATIONS

The present application is a continuation-in-part of U.S. patent application Ser. No. 12/841,608, filed on Jul. 22, 2010, the disclosure of which is incorporated herein by reference in its entirety and for all purposes.

FIELD OF THE INVENTION

The present invention relates in general to power conversion and in particular to methods and apparatus for converting alternating current (AC) to direct current (DC).

BACKGROUND OF THE INVENTION

Many household and industrial machines and devices are powered by a direct current (DC) power source that has been rectified from alternating current (AC) power provided by the AC mains. The AC-to-DC rectification is typically accomplished using a bridge rectifier 104 (or "diode bridge") comprised of four diodes 102-1, 102-2, 102-3 102-4 configured as shown in FIG. 1. The bridge rectifier 104 converts the positive and negative half cycles of the AC input voltage Vin to a full-wave-rectified waveform of constant polarity. (See FIGS. 2A and 2B). To produce the desired steady DC output voltage Vout across a load 108, the rectified waveform is filtered by a smoothing circuit, which in its simplest form comprises a smoothing capacitor 106 coupled to the output of the bridge rectifier 104. The smoothing capacitor 106 functions to maintain the DC output voltage Vout near the peak voltage Vpeak during the low portions of the AC input voltage Vin, as shown in FIG. 2C. Some amount of AC ripple is superimposed on the DC output Vout, even following filtering by the smoothing capacitor 106. The ripple may or may not be tolerable, depending on the application. In applications where it is not tolerable, additional filtering can be employed to reduce it to an acceptable level.

The AC/DC converter 100 in FIG. 1 generates a DC output voltage Vout near the peak voltage Vpeak of the AC input voltage Vin (see FIG. 2C). However, many applications require a much lower voltage. For example, many machines and devices require a DC voltage of 12 volts DC or less but the peak voltage Vpeak of the center-tapped 120 volts RMS (root mean square) residential mains is near 170 V. To lower the DC voltage to the required level, a step-down transformer or DC-DC converter 302 (i.e., "buck converter") is used. FIG. 3 illustrates use of a DC-DC converter 302. The DC-DC converter 302 comprises a switch (typically a metal-oxide-semiconductor field effect transistor (MOSFET)) 304, a diode (or, alternatively, a second MOSFET) 306, an inductor 308, a filter capacitor 310, and a pulse-width modulator (PWM) control 312. The PWM control 312 controls the opening and closing of the switch 304 at a fixed frequency f that is much higher than the 60 Hz line frequency (typically greater than 1 kHz). When the switch 304 is turned on, current flows through it, the inductor 308, and then into the filter capacitor 310 and the load 108. The increasing current causes the magnetic field of the inductor 308 to build up and energy to be stored in the inductor's magnetic field. When the switch 304 is turned off, the voltage drop across the inductor 308 quickly reverses polarity and the energy stored by the inductor 308 is used as a current source for the load 108. The DC output voltage Vout is determined by the proportion of time the switch 304 is on ($t_{ON}$) in each period T, where T=1/f. More specifically, Vout=DVin(dc), where D=$t_{ON}$/T is known as the "duty cycle" and Vin(dc) is the source DC input voltage provided at the output of the bridge rectifier 104. The PWM control 312 is configured in a feedback path, allowing it to regulate the DC output voltage Vout by modulating the duty cycle D.

Although the AC/DC converter 300 in FIG. 3 addresses the inability of the AC/DC converter 100 in FIG. 1 to step down the DC voltage to a lower DC voltage, it does not address another well-known problem of conventional AC/DC converters—low power factor. The power factor of an AC/DC converter is a dimensionless number between 0 and 1 indicating how effectively real power from an AC power source is transferred to a load. An AC/DC converter with a low power factor draws more current from the mains than one having a high power factor for the same amount of useful power transferred. A low power factor can result due to the input voltage Vin being out of phase with the input current Iin or by action of a nonlinear load distorting the shape of the input current Iin. The latter situation arises in non-power-factor-corrected AC/DC converters, such as those described in FIGS. 1 and 3, which as described above use a diode bridge 104. The filter capacitor 106 of the AC/DC converter 100 in FIG. 1 (and, similarly, the filter capacitor 310 of the AC/DC converter 300 in FIG. 3) remains charged near the peak voltage Vpeak for most of the time. This means that the instantaneous AC line voltage Vin is below the filter capacitor 106 voltage for most of the time. The diodes 102-1, 102-2, 102-3 102-4 of the bridge rectifier 104 therefore conduct only for a small portion of each AC half-cycle, resulting in the input current Iin drawn from the mains being a series of narrow pulses, as illustrated in FIG. 4. Note that although the input current Iin is in phase with the AC input voltage Vin, it is distorted and, therefore, rich in harmonics of the line frequency. The harmonics lower the power factor, resulting in reduced conversion efficiency and undesirable heating in the AC mains generator and distribution systems. The harmonics also create noise that can interfere with the performance of other electronic equipment.

To reduce harmonics and increase the power factor, conventional AC/DC converters are often equipped with a power factor correction (PFC) pre-regulator. The PFC pre-regulator can be formed in various ways. One approach employs a PFC boost converter 502 coupled between the bridge rectifier 104 and the DC-DC converter 302, as shown in the power-factor-corrected AC/DC converter 500 in FIG. 5. The PFC boost converter 502 comprises an inductor 504, switch 506, diode 508, output capacitor 510 and a PFC control 512. The PFC control 512 controls the on and off state of the switch 506. When the switch 506 is switched on, current from the mains flows through the inductor 504, causing energy to build up and be stored in the inductor's magnetic field. During this time, current to the DC-DC converter 302 and load 108 is supplied by the charge in the capacitor 510. When the switch 506 is turned off, the voltage across the inductor 504 quickly reverses polarity to oppose any drop in current, and current flows through the inductor 504, the diode 508 and to the DC-DC converter 302, recharging the capacitor 510 as well. With the polarity reversed, the voltage across the inductor 504 adds to the source input DC voltage, thereby boosting the input DC voltage. The PFC boost converter 502 output voltage is dependent on the duty cycle D of the on-off switch control signal provided by the PFC control circuit 512. More specifically, the PFC boost converter 502 output voltage is proportional to 1/(1−D), where D is the duty cycle and (1−D) is the proportion of the switching cycle T (i.e., commutation period) that switch 506 is off. In addition to setting the duty cycle D, the PFC control 512 forces the DC-DC converter 302 and load 108 to draw current that on average follows the sinusoidal shape of the AC input voltage Vin, thereby reducing harmonics and increasing the power factor of the AC/DC converter 500.

The power-factor-corrected AC/DC converter 500 is suitable for many applications. However, it has a number of drawbacks. First, the AC/DC converter is less efficient than desired, particularly since the AC-to-DC power conversion requires two stages—the PFC boost converter 502 front end and the DC-DC converter 302 final stage. Second, the converter 500 has a large parts count, including parts necessary to implement the two control circuits (PFC control 512 and PWM control 312), which increases design complexity and cost, and makes the converter 500 more susceptible to failure. Third, the PFC boost converter 502 generates very high voltages, which stress the converter's parts and raise safety concerns.

It would be desirable, therefore, to have AC/DC conversion methods and apparatus that are efficient at converting AC to DC, avoid power factor degradation attributable to using a bridge rectifier, do not require voltage boosters to counteract power factor degradation, and do not have a large parts count.

SUMMARY OF THE INVENTION

Methods and apparatus for converting alternating current (AC) to direct current (DC) are disclosed. An exemplary AC/DC converter that converts an AC input voltage Vin, such as may be provided by the AC mains, to a DC output voltage comprises an inductor, a capacitor, a plurality of switches, and a controller. The controller configures the plurality of switches, inductor, and capacitor to operate as a buck converter during times when Vin>Vout and to operate as an inverting buck converter during times when Vin<−Vout.

In one embodiment of the invention, the controller modulates the duty cycles of the plurality of switches to regulate the DC output voltage Vout to the desired, constant output level. In another embodiment of the invention, the duty cycles of the switches are held constant but their frequency is changed in response to variations in the load. On average, the input current to the AC/DC converter is inversely proportional to the frequency of the switch drive signals. Therefore, by holding the duty cycles of the switch drive signals constant and adjusting their frequency as the load varies, the input current is forced to adapt to changes in the load and the power factor is maintained, as a result.

The AC/DC converter of the present invention converts the AC input voltage Vin to the DC output voltage Vout directly, i.e., without the need for a bridge rectifier or transformer to complete the AC-to-DC conversion. Direct AC to DC conversion avoids power factor degradation problems attributable to use of bridge rectifiers, obviates the need for specialized power factor correction pre-regulator circuitry, and results in a low parts count and an energy-efficient design.

Further features and advantages of the invention, including descriptions of the structure and operation of the above-summarized and other exemplary embodiments of the invention, will now be described in detail with respect to accompanying drawings, in which like reference numbers are used to indicate identical or functionally similar elements.

DETAILED DESCRIPTION

Figure 1:
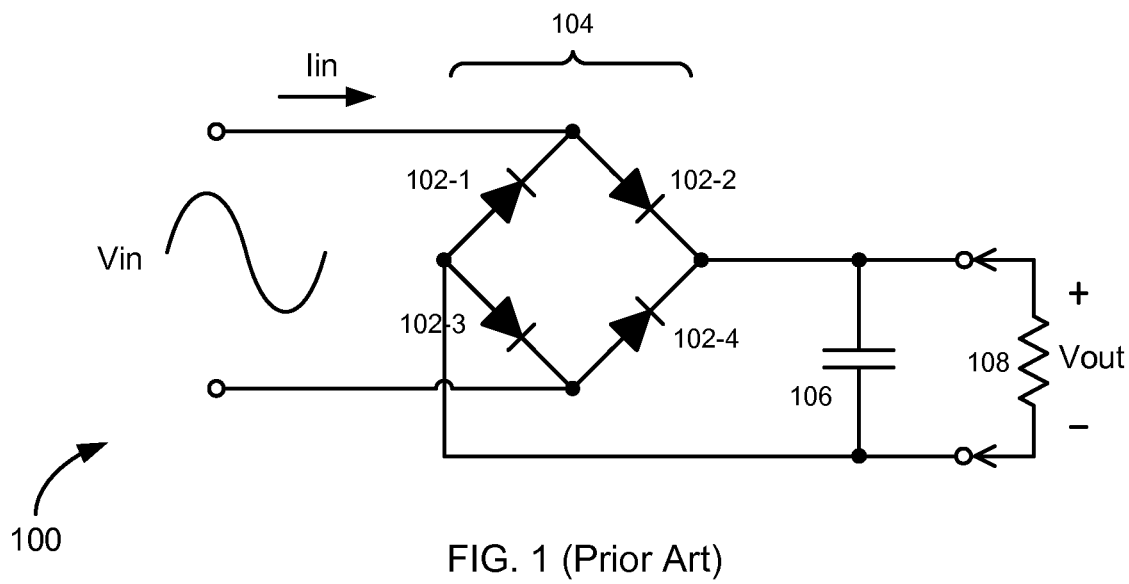
FIG. 1 is a circuit diagram of a conventional alternating current to direct current (AC/DC) converter.
Figure 2A:
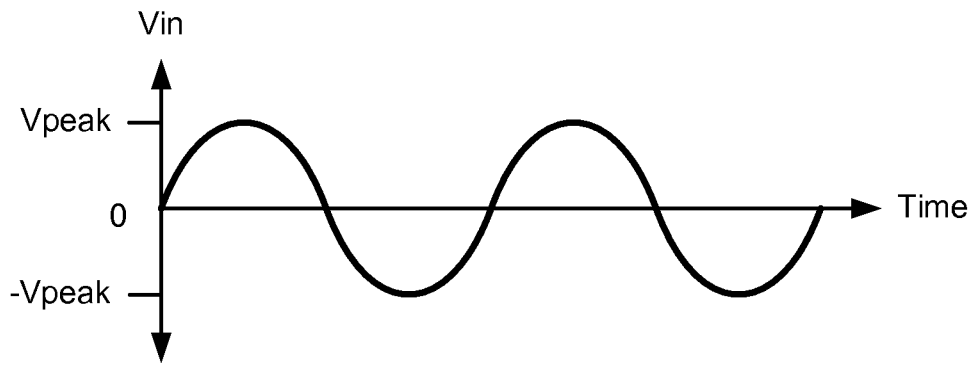
FIG. 2A is a signal diagram of the AC input voltage Vin applied to the AC input of the AC/DC converter in FIG. 1.
Figure 2B:
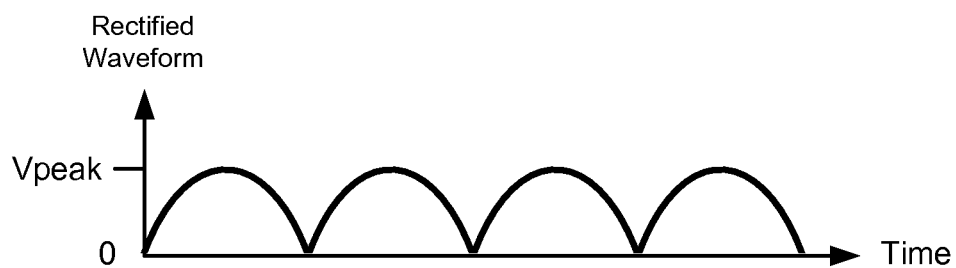
FIG. 2B is a signal diagram of the unfiltered, full-wave-rectified voltage waveform produced at the output of the bridge rectifier of the AC/DC converter in FIG. 1.
Figure 2C:
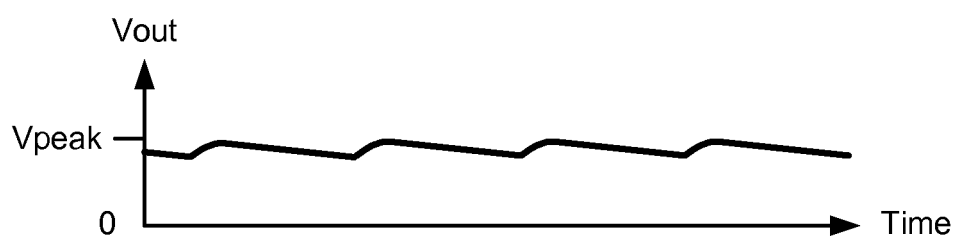
FIG. 2C is a signal diagram of the DC output voltage of the AC/DC converter in FIG. 1 after having been filtered by a smoothing capacitor.
Figure 3:
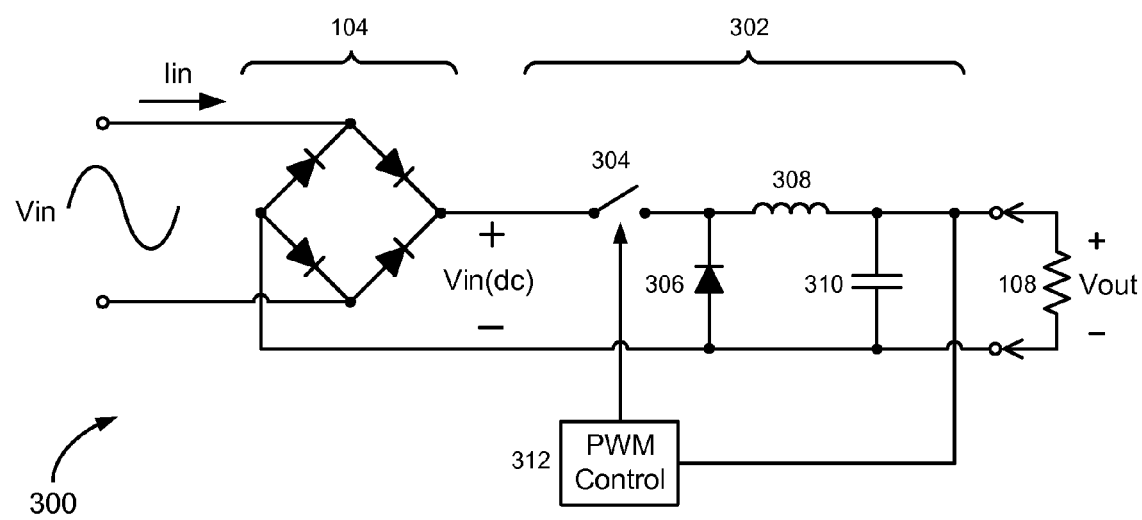
FIG. 3 is a circuit diagram of an AC/DC converter equipped with a step-down buck converter to step down the DC output voltage to a level lower than possible using just a bridge rectifier and smoothing capacitor.
Figure 4:
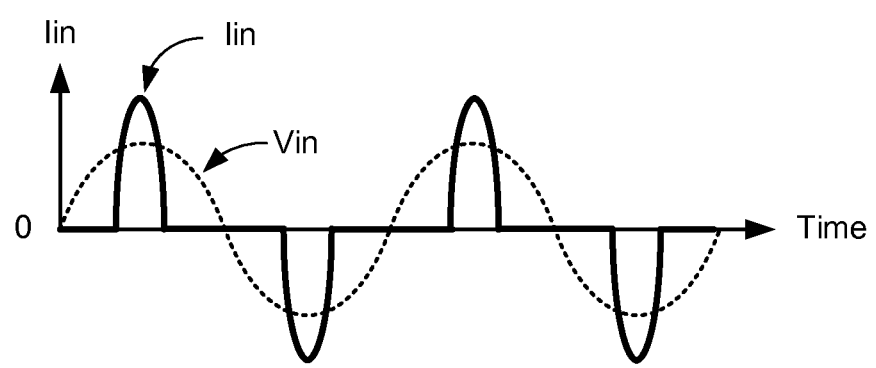
FIG. 4 is a signal diagram illustrating how the bridge rectifier used by the AC/DC converters in FIGS. 1 and 3 causes current to be drawn from the AC power source in narrow pulses that are rich in harmonics.
Figure 5:
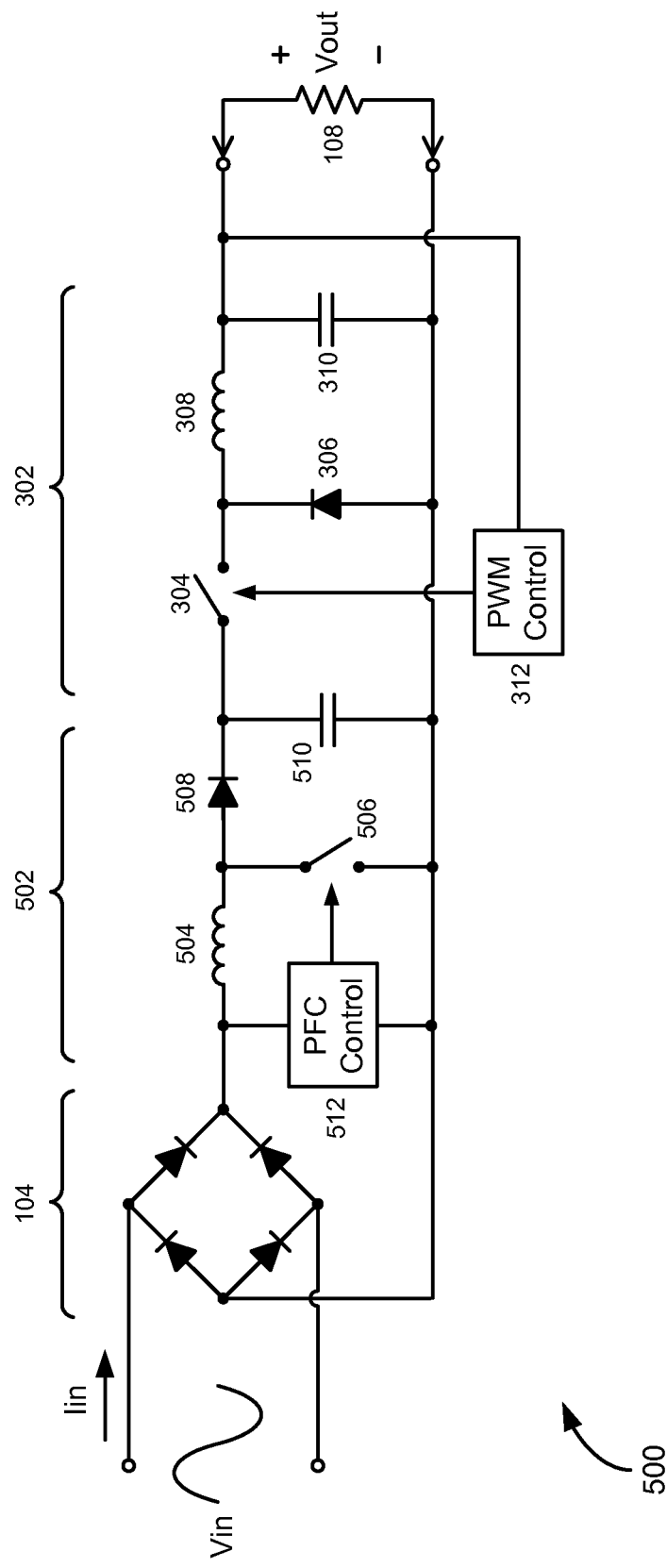
FIG. 5 is a circuit diagram of an AC/DC converter having a step-down buck converter and a power-factor-correcting boost converter that compensates for power factor degradation caused by the AC/DC converter's bridge rectifier.
Figure 6:
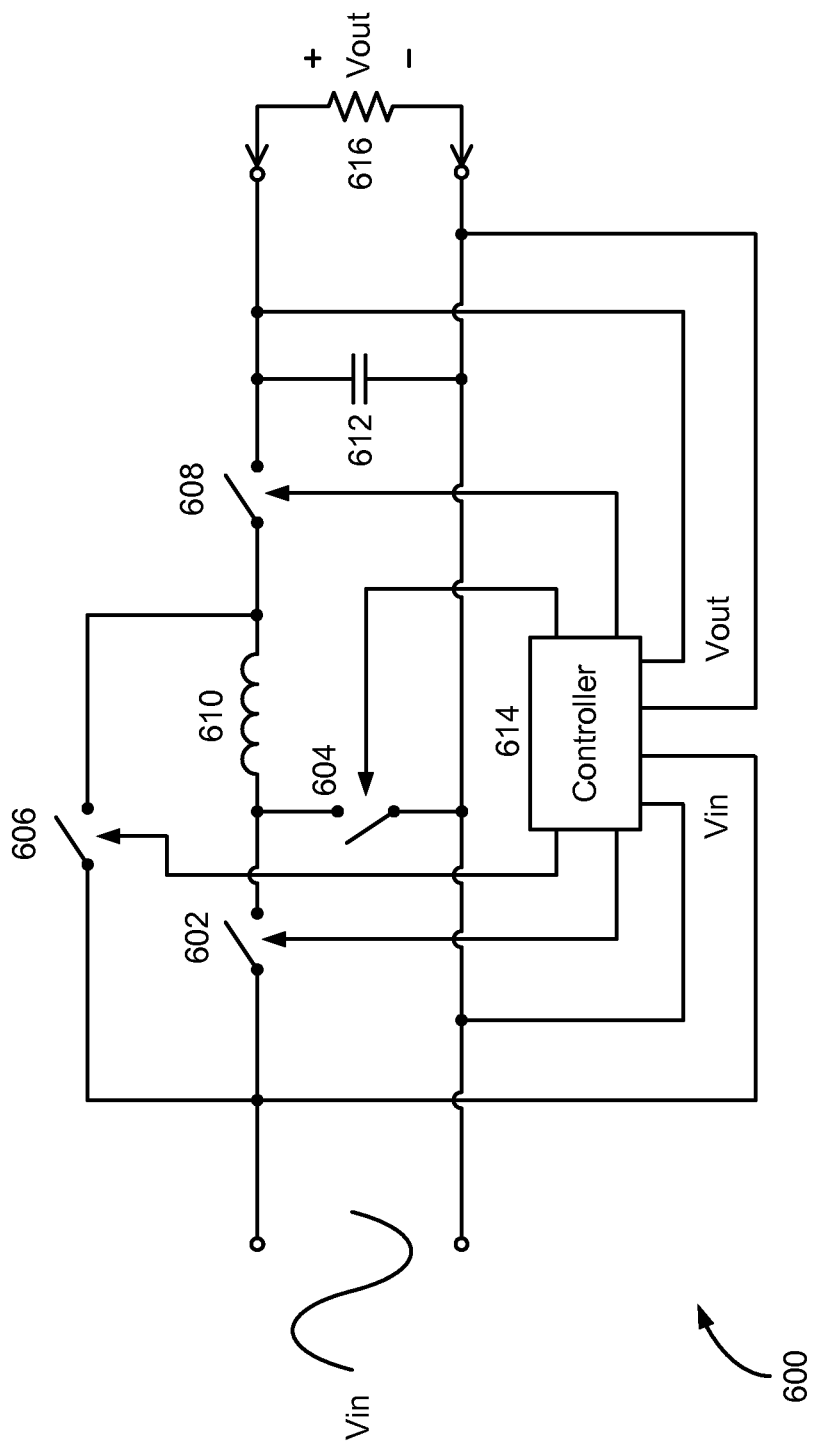
FIG. 6 is a circuit diagram of an AC/DC converter, according to an embodiment of the present invention.

Referring to FIG. 6, there is shown an alternating current to direct current (AC/DC) converter 600, according to an embodiment of the present invention. The AC/DC converter 600 comprises first, second, third and fourth switches 602, 604, 606 and 608, an inductor 610, a smoothing capacitor 612, and a controller 614. The first switch 602 is coupled between one terminal of the AC input and a first terminal of the inductor 610; the second switch 604 is coupled between the first terminal of the inductor 610 and the opposing-polarity terminal of the AC input; the third switch 606 is coupled between the AC input and the second terminal of the inductor 610; and the fourth switch 608 is coupled between the second terminal of the inductor 610 and the positive DC output terminal. The controller 614 generates switch drive signals for controlling the switching of the first, second, third and fourth switches 602, 604, 606 and 608, depending on the instantaneous AC input voltage Vin compared to the DC output voltage, and selectively modulates the duty cycles of the first, second, third and fourth switches 602, 604, 606 and 608 switches so that the DC output voltage Vout is maintained at the desired level, as is explained in more detail below.

The components of the AC/DC converter 600 comprise discrete devices, one or more integrated circuit (IC) chips, or a combination of discrete devices and IC chips. In one embodiment, the controller 614 and first, second, third, and fourth switches 602, 604, 606 and 608 are integrated in a single IC chip manufactured in accordance with a standard complementary metal-oxide-semiconductor (CMOS) fabrication process, with the first, second, third, and fourth switches 602, 604, 606 and 608 comprising metal-oxide-semiconductor field-effect transistors (MOSFETs). In another embodiment, the first, second, third, and fourth switches 602, 604, 606 and 608 are formed in a first IC chip and the controller is formed in a second IC chip. Whereas the first, second, third, and fourth switches 602, 604, 606 and 608 comprise silicon-based MOSFETs in the exemplary embodiment just described, other types of switching devices may be used, including conventional switches, diodes, relays, or other semiconductor-based or non-semiconductor-based switching devices. For example, in applications requiring fast switching speeds, compound-semiconductor-based transistor devices, such as high electron mobility transistors (HEMTs) or heterojunction bipolar transistors (HBTs), may be used to implement the first, second, third, and fourth switches 602, 604, 606 and 608 switches, instead of silicon-based MOSFETs. For the purpose of this disclosure, the term "switch" is used in its broadest sense to include all of these types of switches and any other suitable switching device. The inductor 610 and capacitor 612 may also be integrated in the one or more IC chips, or either or both of these devices may be discrete devices coupled to external pins of the one or more IC chips.

The AC/DC converter 600 is configured to directly convert an AC input voltage Vin, such as may be provided by the AC mains, to a DC output voltage Vout, without the need for a diode bridge or a step-down transformer. Direct conversion is accomplished by controlling and modulating the on/off states of the first, second, third, and fourth switches 602, 604, 606 and 608 using the controller 614. More specifically, depending on the instantaneous AC input voltage Vin compared to the DC output voltage Vout, the switches are turned on (closed), turned off (opened), driven by a switch drive signal of duty cycle D, or driven by a complementary switch drive signal of duty cycle (1−D). The switch drive signal (labeled "D" in FIG. 6) and the complementary switch drive signal (labeled "1−D" in FIG. 6) are periodic (or semi-periodic) and have a common, fixed switching frequency f=1/T, where T is the switching period. As illustrated in the signal diagram in FIG. 7 and shown in the switching table in FIG. 8, when Vin>Vout, the first switch 602 is driven by the switch drive signal at a duty cycle $t_{ON}/T=D$, the second switch 604 is driven by the complementary switch drive signal at a duty cycle $(T-t_{ON})/T=(1-D)$, the third switch 606 is turned off, and the fourth switch 608 is turned on. When Vin<−Vout, the first switch 602 is turned off, the second switch 604 is turned on, the third switch 606 is driven by the switch drive signal at a duty cycle D, and the fourth switch is driven by the complementary switch drive signal at a duty cycle (1−D). Finally, when Vin is greater than −Vout but less than Vout, i.e. when |Vin|<Vout, the first, second, third, and fourth switches 602, 604, 606 and 608 are turned off.

The DC output voltage of the AC/DC converter 600 is equal to D|Vin|, where |Vin| is the absolute value of the instantaneous AC input voltage. According to one embodiment, the controller 614 modulates the duty cycle D, regulating the DC output voltage Vout so that it is maintained at a constant level. The duty cycle D may also be managed to improve the power factor of the AC/DC converter 600. Whereas D is modulated to maintain the DC output voltage Vout at a constant level in the exemplary embodiment described here, in general Vout, D, and Vin are all variables. Accordingly, Vout need not necessarily be maintained at a constant level.

Figure 9:
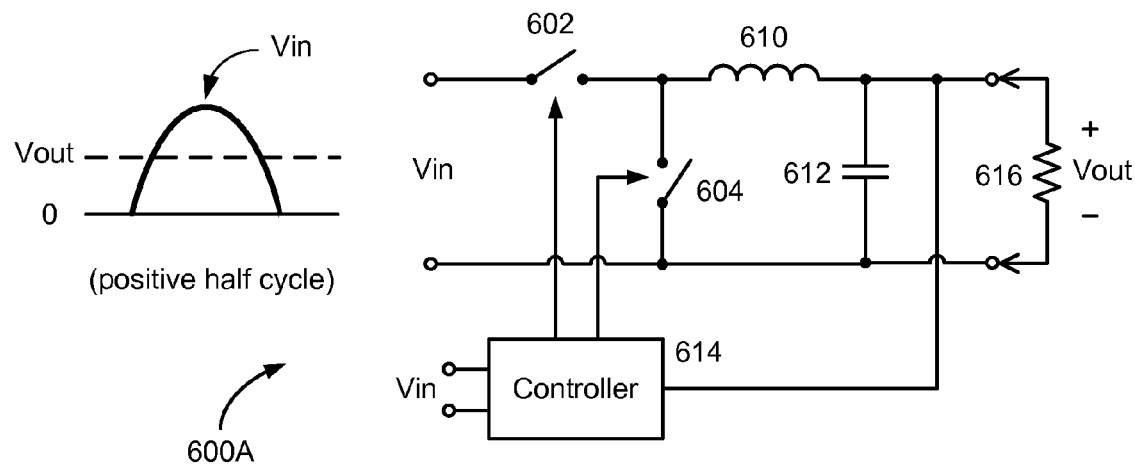
FIG. 9 is a circuit diagram illustrating how the AC/DC converter in FIG. 6 reduces to and operates as a buck converter during times of positive half cycles of the AC input voltage when Vin>Vout.

That Vout=|Vin| is more readily apparent by understanding that the AC/DC converter 600 comprises an integrated (i.e., conjoined) buck converter and an inverting buck converter. During the positive half cycles of the AC input waveform when Vin>Vout, the third switch 606 is off, the fourth switch 608 is on, and the AC/DC converter 600 reduces to and operates as a buck converter 600A, as illustrated in FIG. 9. The first and second switches 602 and 604 serve as the high-side and low-side switches of the buck converter and are driven by the switch drive signal at duty cycle D and complementary switch drive signal at a duty cycle (1−D), respectively. The first and second switches 602 and 604 therefore alternately configure the inductor 610 between storing energy and supplying current during positive half cycles of the AC input voltage when Vin>Vout, and the DC output voltage Vout=DVin.

Figure 10:
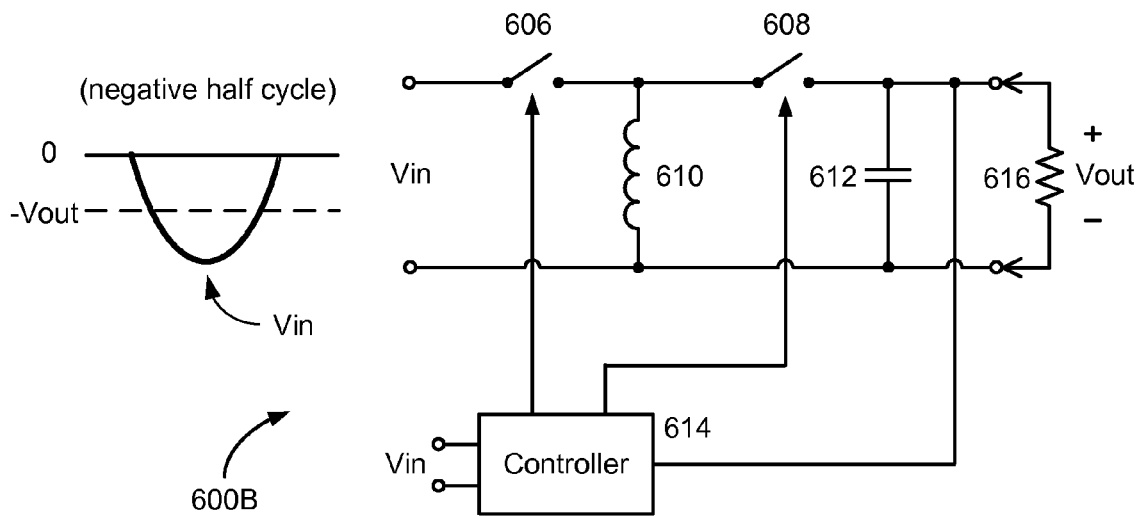
FIG. 10 is a circuit diagram illustrating how the AC/DC converter in FIG. 6 reduces to and operates as an inverting buck converter during times of negative half cycles of the AC input voltage when Vin<−Vout.

During the negative half cycles of the AC input waveform when Vin<−Vout, the first switch 602 is off, the second switch 604 is on, and the AC/DC converter 600 reduces to and operates as what may be referred to as an "inverting" buck converter 600B, as illustrated in FIG. 10. The third and fourth switches 606 and 608 are driven by the switch drive signal D and complementary switch drive signal (1−D), respectively. The inverting buck converter 600B inverts the negative input voltage Vin, alternately configuring, by the switching action of the third and fourth switches 606 and 608, the inductor 610 between storing energy and supplying current during the negative half cycles of the AC input voltage when Vin<−Vout, to produce an output voltage Vout equal to D|Vin|. Hence, considering both positive and negative half cycles, the AC/DC converter 600 produces a DC output voltage Vout=D|Vin|.

Figure 11:
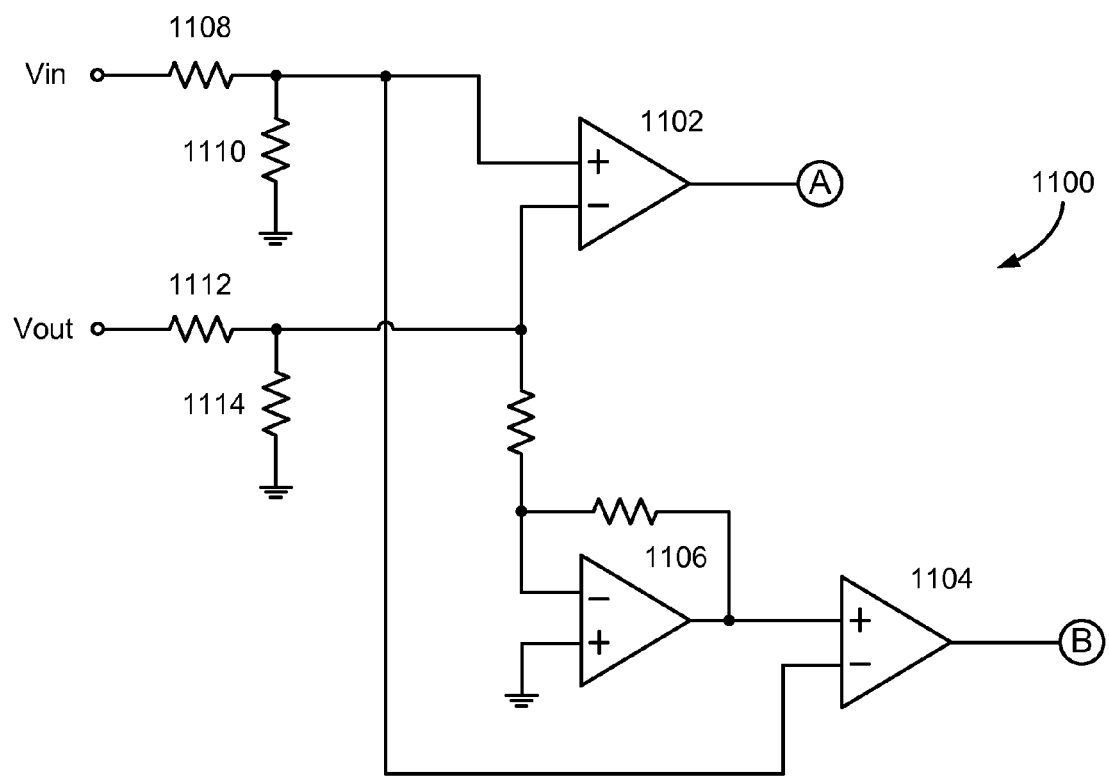
FIG. 11 is a circuit diagram of a comparison circuit that forms part of the controller of the AC/DC converter in FIG. 6 and which compare the AC input voltage Vin to the DC output voltage Vout to determine times whether Vin>Vout and Vin<−Vout.

The controller 614 of the AC/DC converter 600 includes a comparison circuit that continually compares the AC input voltage Vin to the DC output voltage Vout, to determine whether Vin>Vout or Vin<−Vout. FIG. 11 is a drawing of an exemplary comparison circuit 1100 that performs this task. The comparison circuit 1100 comprises first and second comparators 1102 and 1104, an inverting amplifier 1106, a first voltage divider including resistors 1108 and 1110, and a second voltage divider including resistors 1112 and 1114. The first voltage divider scales the AC input voltage down to a scaled AC input voltage αVin so that the voltage is within the acceptable input voltage range limit of the first comparator 1102. The second voltage divider scales the DC output voltage down by the same amount to produce a scaled DC output voltage αVout. The first comparator 1102 compares the scaled AC input voltage αVin to the scaled DC output voltage αVout, producing a high output voltage when Vin>Vout and a low output voltage when Vin<Vout. The inverting amplifier 1106 inverts the scaled DC output voltage αVout to produce a scaled and inverted DC output voltage −αVout. The second comparator 1104 compares the scaled and inverted DC output voltage −αVout to the scaled AC input voltage αVin, producing a high output voltage when Vin<−Vout and a low output voltage when Vin>−Vout.

Figure 12:
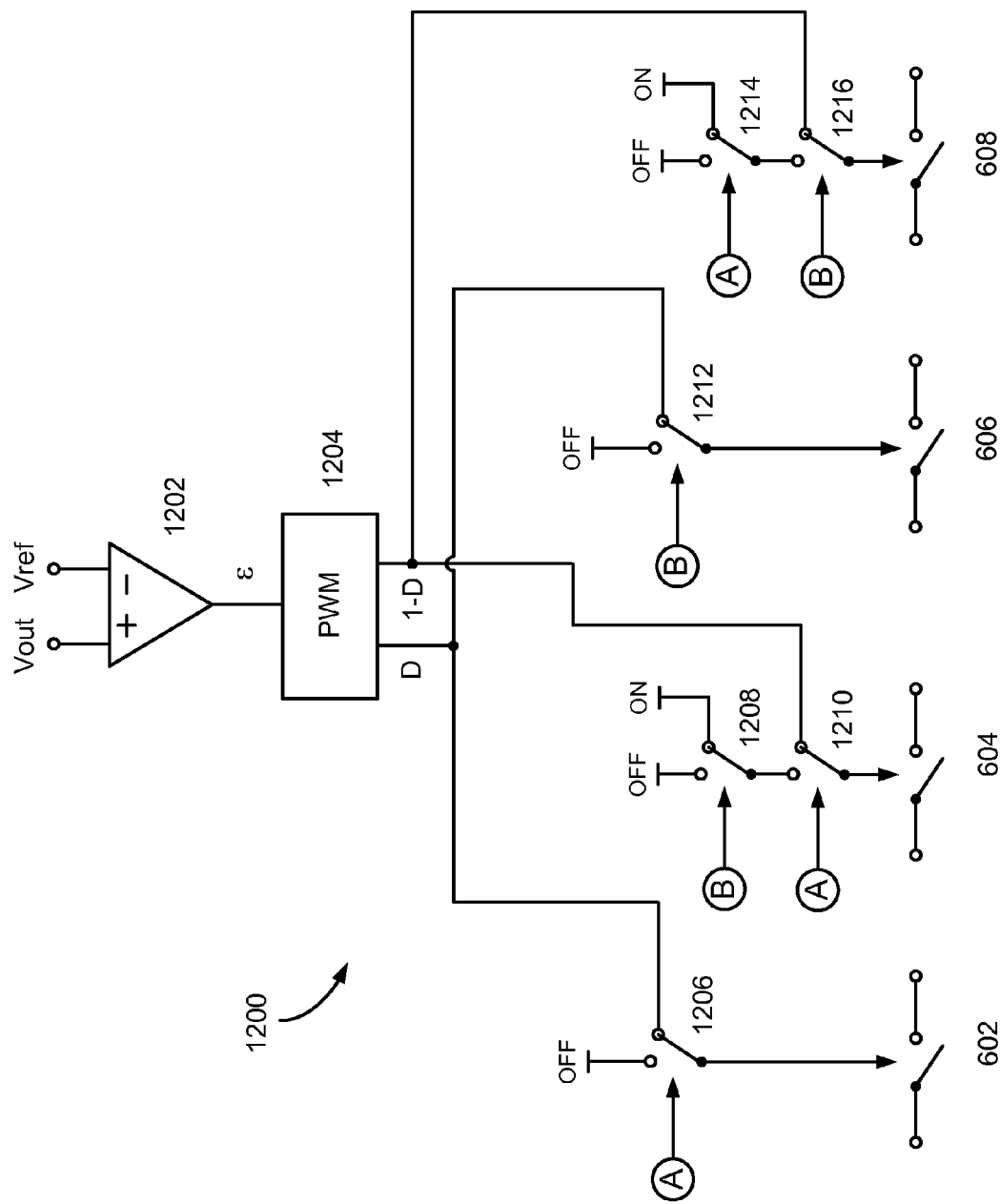
FIG. 12 is a circuit diagram of a switch control circuit that forms part of the controller of the AC/DC converter in FIG. 6 and which operates to control the switching of the switches of the AC/DC converter in FIG. 6.

The controller 614 of the AC/DC converter 600 also includes a switch control circuit 1200, shown in FIG. 12, which controls the switching of the first, second, third, and fourth switches 602, 604, 606 and 608. The switch control circuit 1200 comprises an error amplifier 1202, a pulse-width modulator (PWM) 1204, and switches 1206-1216 having on/off states that control the switching of the first, second, third and fourth switches 602, 604, 606 and 608. The error amplifier 1202 compares the DC output voltage Vout to a precise reference voltage Vref that is equal to and defines the desired DC output voltage Vout and produces an error signals based on the difference between Vref and Vout. The PWM 1204 generates the aforementioned switch drive signal (labeled "D" in FIG. 12) and complementary switch drive signal (labeled "1−D" in FIG. 12) and modulates D based on the error signal c, thereby providing the switch control circuit 1200 the ability to regulate the DC output voltage Vout. The switches 1206-1216 are controlled by the outputs of the first and second comparators 1102 and 1104 of the comparator circuit 1100 in FIG. 11 and control the switching states of the first, second, third and fourth switches 602, 604, 606 and 608, in accordance with the switching table in FIG. 8.

Figures 7, 8:
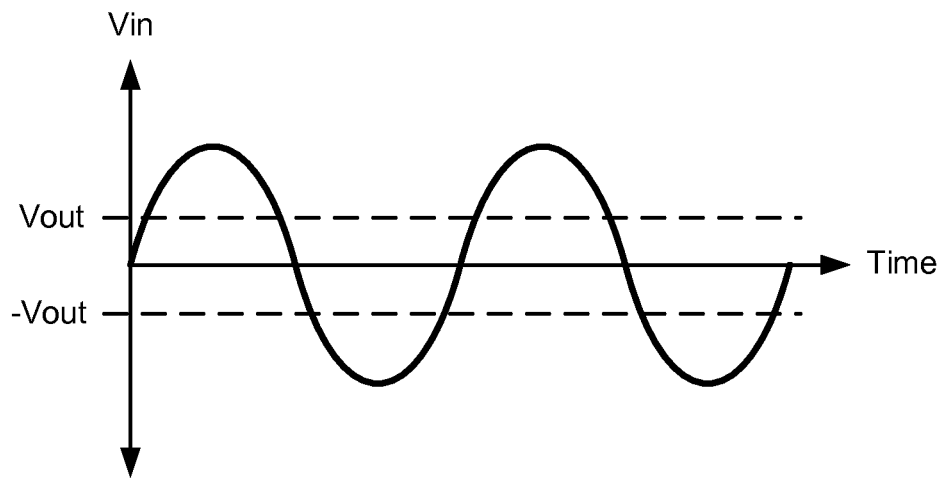
FIG. 7 is a signal diagram of the AC input voltage Vin supplied to the AC/DC converter in FIG. 6 and its relationship to the DC output voltage Vout generated by the AC/DC converter and its inverse −Vout.
FIG. 8 is a table showing how the switches of the AC/DC converter in FIG. 6 are switched and driven, depending on the instantaneous value of the AC input voltage Vin compared to the DC output voltage Vout generated by the AC/DC converter in FIG. 6 and its inverse −Vout.

In the exemplary embodiment above, the switch control circuit 1200 is described as controlling the opening and closing of the switches 606, 604, 606 and 608, according to the switching table in FIG. 8. In another embodiment, the controller 614 is alternatively or further configured to hold switch 608 open during light load conditions. (What defines the light load condition is dependent on the application and established and set during design.) The remaining switches 602, 604 and 606 are configured to operate according to the switching table in FIG. 8, or are configured to not switch at all, with no effect on the load 616. Hence, during light load conditions, the capacitor 612 serves as the power supply for the load 616.

As discussed above, the output voltage of the AC/DC converter 600 can be regulated by adjusting over time (i.e., pulse-width modulating) the duty cycle D of the switch drive signals applied to the switches 602, 604, 606 and 608, based on comparisons of the DC output voltage $V_{out}$ to the AC input voltage $V_{in}$. Since the AC/DC converter 600 operates at essentially constant power, i.e., $P_{out} \approx P_{in}$, the input current $i_{in}$ drawn from the AC mains decreases as the input voltage $V_{in}$ increases. This inverse dependency of the input current $i_{in}$ on the input voltage $V_{in}$ adversely affects the power factor of the system. In applications in which the load is constant and maintaining a high power factor is of primary concern, the power factor can be maintained at a high value by holding the duty cycle D of the switch drive signals constant, although, of course, at the expense of no regulation. Holding the duty cycle D constant results in essentially unity power factor since the input current $i_{in}$ drawn by the AC/DC converter 600=$i_{in}$=$D^2 V_{in}/R_{load}$ is sinusoidal and in phase with the input voltage $V_{in}$. In most applications, however, a power factor of unity is unnecessary and some level of regulation is desired. Accordingly, in one embodiment of the invention a desired combination of output regulation and power factor is realized by configuring the controller 614 of the AC/DC converter 600 so that it adjusts the duty cycle D of the switch drive signals, based on comparisons of the DC output voltage $V_{out}$ to the AC input voltage $V_{in}$, but only within a range that allows a minimum power factor to be maintained.

In applications in which the load is variable, the power factor can be maintained by simply adjusting the frequency f of the switch drive signals to the switches 602, 604, 606 and 608. Assuming that the capacitor 612 is large enough to maintain a constant voltage across its terminals during each commutation cycle T, the average current that flows through the capacitor 612 is zero. The average input current $i_{in,avg}$ drawn by the AC/DC converter 600 from the AC mains is therefore equal to the average inductor current $i_{L,avg}$. In other words:

$$i_{in,avg} = i_{L,avg} = \frac{1}{T}\int_0^T i_L(t)\,dt,$$

where T=1/f represents the period of the switch drive signals and $i_L(t)$ is the current through the inductor 610.

Figure 13:
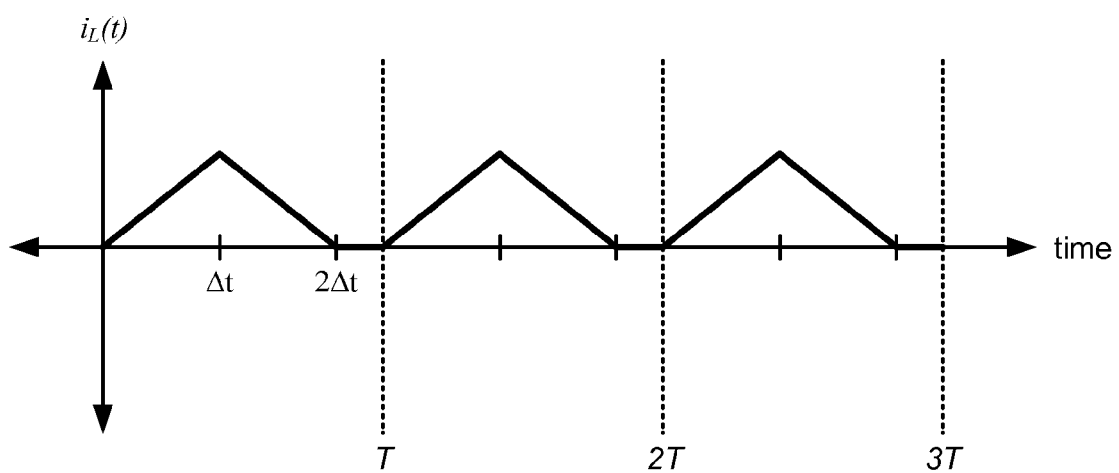
FIG. 13 is a simplified signal diagram depicting the current $i_L(t)$ that flows through the inductor of the AC/DC converter in FIG. 6.

As illustrated in in FIG. 13, for each period T of the inductor current $i_L(t)$, the inductor current $i_L(t)$ rises linearly between 0 and Δt, falls linearly between Δt and 2Δt, and is zero for the remainder of the period. When $i_L(t)$ is integrated over these three intervals, it can be shown that:

$$i_{in,avg} = i_{L,avg} \propto D^2/f.$$

In other words, the average input current $i_{in,avg}$ is proportional to the duty cycle D (more specifically, to $D^2$) and inversely proportional to the frequency f of the switch drive signals applied to the switches 602, 604, 606 and 608. Exploiting this dependency of the average input current $i_{in,avg}$ on the switching frequency f, in one embodiment of the invention the controller 614 of the AC/DC converter 600 is configured to set and hold D of the switch drive signals to a constant value and adjust the switching frequency f of the switch drive signals as changes in the load occur. Setting D to a constant value allows a desired nominal DC output voltage $V_{out}$ to be maintained, and adjusting f in response to changes in the load allows the power factor to be maintained despite variations in the load. When the load increases the controller 614 operates to lower the switching frequency f of the switch drive signals, thereby making the load resistance appear lower and the input current $i_{in}$ drawn from the AC mains to be higher. Conversely, when the load decreases the controller 614 operates to increase the switching frequency f of the switch drive signals, thereby making the load resistance appear higher and the input current $i_{in}$ drawn from the AC mains to be lower. By controlling the switching frequency f of the switch drive signals in this manner, the average input current $i_{in,avg}$ is forced to adapt to changes in the load and the power factor is maintained, as a result.

While various embodiments of the present invention have been described, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments. Rather, the scope of the invention should be determined by the appended claims, including the full scope of equivalents to which such claims are entitled.

What is claimed is:

1. An AC/DC power conversion apparatus, comprising:
a plurality of controlled switches that rectify an input AC voltage and produce a DC output voltage for powering a variable load; and
a controller configured to generate a plurality of switch drive signals that control the switching of said plurality of switches and correct a power factor of said load by adjusting a frequency of one or more of said switch drive signals in response to variations in the variable load,
wherein said controller includes a comparison circuit configured to compare the input AC voltage to the DC output voltage produced by the plurality of controlled switches that rectify the input AC voltage and said plurality of controlled switches is configured to produce said DC output voltage based on comparisons made by said comparison circuit.

2. The AC/DC power conversion apparatus of claim 1, further comprising an inductor, which under the direction of said controller, is alternately connected to and disconnected from said input AC voltage during positive half cycles of the input AC voltage but only when said comparison circuit determines that the input AC voltage is greater than the DC voltage.

3. The AC/DC power conversion apparatus of claim 2, wherein said inductor under the direction of said controller, is alternately connected to and disconnected from said input AC voltage during negative half cycles of the input AC voltage but only when said comparison circuit determines that the input AC voltage is less than the negative of the DC voltage.

4. A method of converting AC power to DC power, comprising:
applying an AC voltage to a plurality of controlled switches of a rectifier;
rectifying said AC voltage using the plurality of controlled switches to produce a DC voltage at an output of the rectifier;
applying said DC voltage across a load;
comparing said AC voltage to said DC voltage;
generating, based on said comparing, switch drive signals that control the opening and closing of the plurality of controlled switches of said rectifier; and
adjusting a frequency of one or more of said switch drive signals as said load varies to correct a power factor.

5. The method of claim 4, wherein producing said DC voltage from said AC voltage is performed by alternately connecting and disconnecting an inductor to and from said AC voltage.

6. The method of claim 4, further comprising adjusting a duty cycle of one or more of said switch drive signals to regulate said DC voltage.

7. The method of claim 6, wherein adjustments made to said duty cycle to regulate said DC voltage are kept unchanged as said frequency is adjusted to correct said power factor.

8. A method of correcting a power factor of a load, comprising:
alternately configuring an inductor of an AC/DC converter between storing energy and supplying current to a load using a plurality of switches that alternately connect and disconnect said inductor to and from an AC power source; and
correcting a power factor of said load, as the load varies, by adjusting a rate at which said inductor is connected to and disconnected from said AC power source,
wherein adjusting the rate at which said inductor is connected to and disconnected from said AC power source comprises adjusting a frequency of a plurality of switch drive signals that control the opening and closing of said plurality of switches.

9. The method of claim 8, further comprising adjusting a duty cycle of one or more of said switch drive signals to regulate a DC voltage produced by the AC/DC converter.

10. The method of claim 9, wherein adjusting the frequency of said plurality of switch drive signals to correct said power factor is performed while the duty cycle of said one or more of said switch drive signals is being adjusted to regulate said DC voltage.

11. A method of correcting a power factor of a load, comprising:
rectifying an AC voltage to a DC voltage using a plurality of controlled switches;
applying said DC voltage across a load;
comparing said AC voltage to said DC voltage;
generating, based on said comparing, switch drive signals that control the opening and closing of said plurality of controlled switches;
based on said comparing, regulating said DC voltage by adjusting duty cycles of said switch drive signals; and
correcting a power factor of the load by adjusting a frequency of said switch drive signals.

12. The method of claim 11, wherein adjustments made to the duty cycles of said switch drive signals to regulate said DC voltage are kept unchanged as the frequency of said switch drive signals is adjusted to correct said power factor.

13. An AC/DC power conversion apparatus for converting an AC input voltage Vin to a DC output voltage Vout, comprising:
an inductor;
a capacitor selectively coupled to said inductor;
a plurality of switches; and
a controller that configures said plurality of switches, inductor and capacitor to operate as a buck converter during times when Vin>Vout and configures the plurality of switches, inductor and capacitor to operate as an inverting buck converter during times when Vin<−Vout,
wherein the inductor, capacitor and plurality of switches collectively operate to rectify an input AC voltage to a DC output voltage for powering a load, and the controller is configured to correct a power factor, as the AC voltage is being rectified, by adjusting a frequency at which said plurality of switches is switched.

14. The method of claim 13, wherein the controller is further configured to adjust a duty cycle of one or more of said plurality of switches to regulate said DC output voltage while it adjusts the frequency at which the plurality of switches is being switched to correct said power factor.

15. An AC/DC power conversion apparatus, comprising:
an inductor;
a capacitor selectively coupled to said inductor;
first, second, third and fourth switches; and
a controller configured to control the switching of said first, second, third and fourth switches and alternately configure said inductor between storing energy and supplying current to a load,
wherein said inductor and said first, second, third and fourth switches are collectively configured to convert AC power from an AC power source to DC power under the direction of said controller, and said controller is further configured to correct a power factor as AC power is being converted to DC power by adjusting a frequency at which said first, second, third and fourth switches are switched.

16. The AC/DC power conversion apparatus of claim 15, wherein said controller is further configured to adjust a duty cycle of one or more of said first, second, third and fourth switches to regulate a DC voltage produced by the AC/DC power conversion apparatus.

17. The AC/DC power conversion apparatus of claim 16, wherein adjustments made to the duty cycle of said one or more of said first, second, third and fourth switches to regulate the DC voltage are made as the frequency of said first, second, third and fourth switches are switched is being adjusted to correct said power factor.

18. An AC/DC power conversion apparatus for delivering DC power to a load, comprising:
   an inductor;
   a capacitor across which a DC output voltage Vout is produced;
   a plurality of switches configured to selectively connect a first terminal of said inductor to an AC input voltage and selectively connect a second terminal of said inductor to a first terminal of said capacitor; and
   a controller configured to: generate a plurality of switch drive signals that control the switching of said plurality of switches, adjust duty cycles of said plurality of switch drive signals to regulate said DC output voltage Vout, and adjust a frequency of said plurality of switch drive signals, in response to variations in the load, to correct a power factor.

19. The AC/DC power conversion apparatus of claim 18, wherein said controller is configured to compare said AC input voltage Vin to said DC output voltage and control the switching of said plurality of switches based on the comparison.

20. The AC/DC power conversion apparatus of claim 18, wherein said controller is configured to control said plurality of switches so that said inductor is alternately connected to and disconnected from said AC input voltage.

21. The AC/DC power conversion apparatus of claim 20, wherein said controller is configured to control said plurality of switches so that said inductor is alternately connected to and disconnected from said AC input voltage but only during times when Vin>Vout and Vin<−Vout.

22. The AC/DC power conversion apparatus of claim 18, wherein adjustments made to the duty cycles of said plurality of switch drive signals to regulate said DC output voltage Vout are performed as the frequency of said plurality of switch drive signals is adjusted to correct said power factor.

* * * * *